United States Patent [19]

Hull

[11] 4,429,683
[45] Feb. 7, 1984

[54] GRADIENT ZONE BOUNDARY CONTROL IN SALT GRADIENT SOLAR PONDS

[75] Inventor: John R. Hull, Downers Grove, Ill.

[73] Assignee: The United States of America as represented by the United States Department of Energy, Washington, D.C.

[21] Appl. No.: 426,362

[22] Filed: Sep. 29, 1982

[51] Int. Cl.³ .............................................. F24J 3/02
[52] U.S. Cl. .................................. 126/415; 126/452; 126/430; 126/435; 4/498
[58] Field of Search ............... 126/415, 416, 426, 430, 126/436, 452, 435; 4/498, 503; 165/2, 1; 23/295 S, 302 R, 302 T; 60/641.15, 641.8

[56] References Cited

U.S. PATENT DOCUMENTS

| 4,241,724 | 12/1980 | Hull. | |
|---|---|---|---|
| 4,244,351 | 1/1981 | Loeb et al. | 126/415 |
| 4,249,518 | 2/1981 | Holt | 126/415 |
| 4,326,498 | 4/1982 | Eckland | 126/415 |
| 4,377,071 | 3/1983 | Assaf et al. | 60/641.8 |
| 4,380,993 | 4/1983 | Spitzer | 126/416 X |

FOREIGN PATENT DOCUMENTS 308271  8/1971  U.S.S.R. .

OTHER PUBLICATIONS

"Membrane Stratified Solar Pond" Solar Energy, vol. 25, pp. 317-325, 1980, Hull, J. R.
"Solar Ponds for Space Heating", Solar Energy, vol. 17, pp. 1-12, 1975, Rabl, A. and Nielsen, C. E.

Primary Examiner—Larry Jones
Attorney, Agent, or Firm—Jeannette M. Walder; Walter L. Rees

[57] ABSTRACT

A method and apparatus for suppressing zone boundary migration in a salt gradient solar pond includes extending perforated membranes across the pond at the boundaries, between the convective and non-convective zones, the perforations being small enough in size to prevent individual turbulence disturbances from penetrating the hole, but being large enough to allow easy molecular diffusion of salt thereby preventing the formation of convective zones in the gradient layer. The total area of the perforations is a sizable fraction of the membrane area to allow sufficient salt diffusion while preventing turbulent entrainment into the gradient zone.

9 Claims, 2 Drawing Figures

GRADIENT ZONE BOUNDARY CONTROL IN SALT GRADIENT SOLAR PONDS

CONTRACTUAL ORIGIN OF THE INVENTION

The United States Government has rights in this invention under Contract No. W-31-109-ENG-38 between the U.S. Department of Energy and the University of Chicago representing Argonne National Laboratory.

BACKGROUND OF THE INVENTION

Salt gradient solar ponds are inexpensive solar heat collector/storage devices having a salt gradient layer which serves as an insulator to enable solar heat to be collected and stored in the solution at the bottom portion of the pond. Sunlight penetrates the salt gradient layer and is absorbed throughout the pond solution, particularly at the bottom of the pond, heating the solution. Because the density of the salt gradient layer increases from its upper boundary to its lower boundary, the salt gradient layer prevents the heated solution at the bottom of the pond from rising to the pond surface. Thus, the solution at the bottom eventually becomes heated to a relatively high temperature.

Ideally, a salt gradient solar pond defines three separate vertical zones or layers in the pond, commonly referred to as the lower convective zone, the gradient zone and the upper convective zone. The transition regions between the zones are referred to as zone boundaries.

The lower convective zones, which is the lower-most zone, has a uniform salient concentration and a uniform temperature profile. The solar heat is collected in this layer.

In the gradient zone, the salt concentration and temperature vary across the depth of the zone. The salt concentration is strongest at the lower edge of the zone adjacent to the lower convective zone, and the temperature of the gradient zone is warmer at the bottom of the zone. Although it is not universally true, frequently both the temperature and salient concentration vary almost linearly across the gradient zone. The gradient zone serves as an insulating barrier because the hot salty solution at the bottom edge of the gradient zone is more dense than the cooler, less salty solution at the top of the zone.

The upper convective zone, which is located immediately above the gradient zone, has a uniform salt concentration and uniform temperature profile. This zone provides isolation from the compensation for minor turbulences, etc. induced at the surface of the pond.

With proper design and under ideal conditions, the different zones will remain separate and distinct over a long period. However, excessive surface turbulence can cause the depth of the upper convective layer to increase, thereby decreasing the size of the gradient zone with an attendant reduction in its insulating effectiveness. Excessive mixing of the pond could eliminate the gradient zone entirely. Minor changes in the salient concentrations due to zone boundary migration can also diminish the gradient zone where at some value it may become too thin to be of much value. Consequently, some form of maintenance is generally required.

One of the key problems of salt gradient solar ponds is the control of the size of the gradient zone. From a thermal viewpoint, it is desirable to maintain the thickness of the gradient zone relatively large. The thicker the gradient zone, the greater the insulating value of the zone, and the less heat that is lost from the bottom of the pond to the surface. However, the thicker the gradient zone, the less sunlight that reaches the bottom of the pond. Thus, there is less heating of the storage layer solution. For a given pond operating temperature, there is an optimal gradient zone thickness. In practice, the optimal thickness is almost always greater than 1 meter.

A problem that arises is that the equilibrium thickness of the pond is always much less than what is desired thermally. In a practical pond, once the gradient zone is established, one or both of the convecting zones will grow at the expense of the gradient zone. The zone boundaries move until the thickness of the gradient zone reaches an equilibrium value, and the equilibrium thickness is much less than one meter for practical pond operating temperatures.

Zone boundary migration imposes a maintenance penalty on the operation of salt gradient solar ponds. If left unattended for several months, the gradient zone becomes too thin to be very effective. To keep the gradient zone thickness at the optimal design value, the gradient zone must be continually repaired. This requires energy to power pumps as well as the addition of considerably more makeup salt to the pond than would be required if the zone boundaries could be maintained stationary. The potential market for salt gradient ponds could be significantly expanded if this maintenance problem could be eliminated, so that salt gradient solar ponds could run unattended for long periods of time.

Laboratory experiments have demonstrated that zone boundary migration in salt gradient ponds is caused by turbulent entrainment into the gradient zone due to convective motions in both the lower and upper convective zones. See article by P. F. Linden, entitled "The Deepening of a Mixed Layer in a Stratified Fluid", *Journal of Fluid Mechanics*, Volume 71, pages 385–405 (1975). One approach for preventing this entrainment is to stretch transparent horizontal impermeable membranes across the pond at the zone boundaries. Salt gradient solar ponds incorporating such arrangement are disclosed, for example in U.S.S.R. Pat. No. 30827 to G. Ya. Umarov, R. A. Zaknidov, and Yu. U. Usmanov. Although this method solves the problem of turbulent entrainment, this method does not achieve the desired outcome because the membranes do not allow the transport of salt across them. Consequently, convective zones form at the top and bottom of the gradient zone on the gradient zone side of the membranes for the same reason that convective zones form in the convective layers at the top and bottom of the pond. The gradient zone itself will break up into a central smaller gradient zone which is located between upper and lower conductive zones created immediately adjacent to the gradient zone barriers.

Another approach is disclosed in Argonne National Laboratories Report. No. ANL-CT-80-23, of Sha et al., entitled "Some Basic Considerations and Possible Improvements on the Solar Pond". In this approach, a transparent honeycomb barrier is located in the gradient zone. The barrier has vertically open conductive passages or cells which extend between the lower and upper convective zones. The vertical height of the honeycomb barrier determines the height of the gradient zone and once the barrier is fabricated it cannot be varied. Moreover, the barrier is three dimensional and quite complex, making it difficult and expensive to fabricate and to support extended open uniformly across the width of the pond.

SUMMARY OF THE INVENTION

This invention provides a method and apparatus for suppressing zone boundary migration in a salt gradient solar pond. In accordance with the invention, physical barriers in the form of transparent or translucent perforated membranes are extended across the pond at the boundaries between the convective and non-convective zones.

The perforations are small enough in size to prevent individual turbulence disturbances from penetrating the hole, but are large enough to allow easy molecular diffusion of salt to thereby prevent the formation of convective zones in the gradient layer. The total area of the perforations is a sizable fraction of the membrane area to allow sufficient salt diffusion while preventing turbulent entrainment into the gradient zone. Thus suppression of movement of the zone boundaries is automatically achieved.

More specifically, in a salt gradient solar pond having upper and lower convective layers and a gradient layer interposed between the upper and lower convective layers, a first membrane is extended horizontally across the pond at a depth corresponding to the depth of the boundary between the upper convective layer and the gradient layer and a second membrane is extended horizontally across the pond at a depth corresponding to the depth of the boundary between the gradient layer and the lower convective layer. The first and second membranes are perforated to permit molecular diffusion of salt across the membranes. The unperforated part of each membrane provides a sufficient barrier to inhibit the passage of turbulence across the membrane which would otherwise erode the gradient layer.

In some solar pond installations, the effects of surface disturbances caused by wind, evaporation or mixing due to waves, for example, are minimal, a single membrane may be used, being extended across the pond at the boundary between the gradient zone and one of the convective zones.

BRIEF DESCRIPTION OF THE DRAWINGS

The invention will best be understood by reference to the following detailed description of a preferred embodiment taken in conjunction with the accompanying drawings in which.

DESCRIPTION OF THE PREFERRED EMBODIMENT

Figure 1:
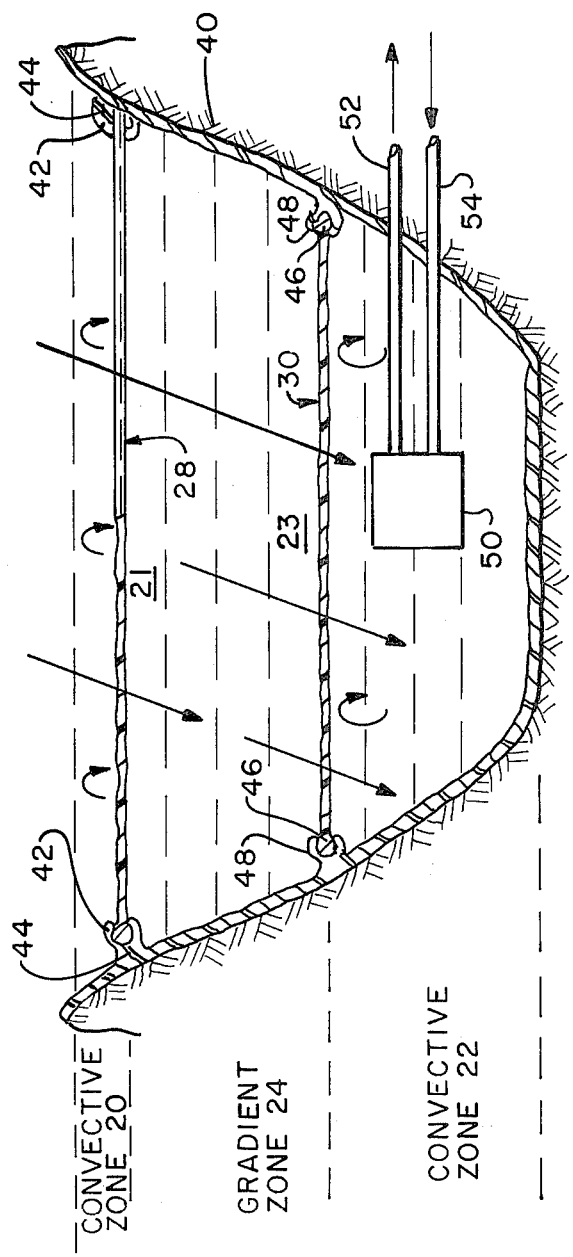
FIG. 1 is side sectional view of a salt gradient solar pond having perforated membranes extending across the pond at the zone boundaries in accordance with the present invention.

Referring to FIG. 1, the salt gradient solar pond has three separate vertical zones or layers including an upper convective zone 20, a lower convective zone 22 and a gradient zone 24 interposed between the upper convective zone 20 and the lower convective zone 22. The transition region between the upper convective zone 20 and the gradient zone forms a first zone boundary 21, and the transition region between the gradient zone and the lower convective zone forms a second zone boundary 23.

The lower convective zone 22, has a uniform salient concentration and thermal temperature. This is the layer in which heat is collected.

The gradient zone 24, which is located between the upper convective zone 20 and the lower convective zone 22, serves in effect as an insulating barrier to retain heat in the lower convective zone. Salt concentration and temperature increase across the gradient zone from the top of the zone to the bottom of the zone.

The upper convective zone 20 has a uniform salt concentration and thermal temperature. This zone effectively isolates and/or compensates for the minor turbulences, etc. induced at the surface of the pond.

Figure 2:
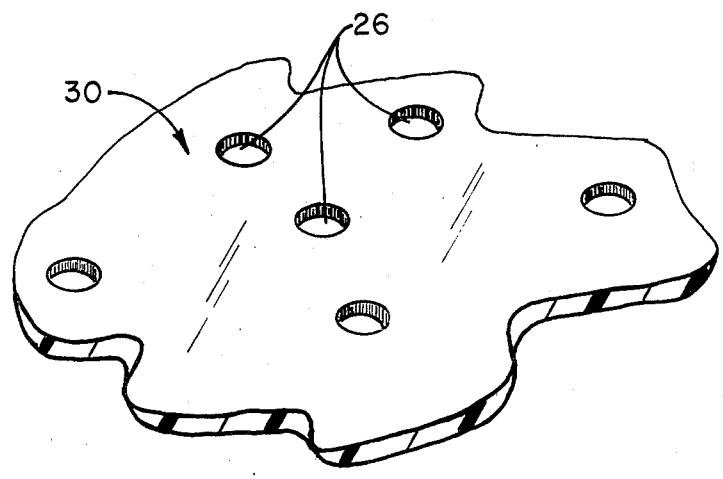
FIG. 2 is an enlarged partial view of one of the membranes illustrating the perforations provided therein.

In accordance with the invention, perforated membranes 28 and 30 are extended horizontally across the pond at depths corresponding to the depths of the upper and lower zone boundaries 21 and 23, respectively. The perforations are not illustrated in FIG. 1 to simplify the drawing, but a portion of membrane 30 is shown in FIG. 2, to illustrate the perforations 26. The membranes are preferably of a translucent or transparent plastic material to allow passage of solar radiation. The membrane material is selected to have an index of refraction similar to that of the pond solution to minimize reflection of light due to the difference between the indices of refraction of the membranes and the pond solution. This will enhance the transmission of solar radiation through the upper convective layer and the gradient layer to the lower convective layer in which it is stored. One material suitable for this purpose is made by DuPont under the tradename Teflon FEP (fluorinated ethylene propylene). The membranes are as thin as possible to maximize passage of solar radiation, but of sufficient thickness to withstand tearing.

Referring to FIG. 2, the diameter of the perforations 26 in both membranes, such as membrane 30 a portion of which is shown in FIG. 2, is in the range of 0.1 mm to 1 cm. The size of the perforations is small enough to prevent individual turbulence disturbances from penetrating the hole, yet large enough to allow easy molecular diffusion of salt across the barrier. The total area of perforations is a size of a fraction of the membrane area to allow sufficient salt diffusion across the barrier. The proportion of perforated to open area is in the range of 10–50%, and is preferably 20%.

The perforations 26 are illustrated as being generally circular, but the perforations may be square or oval. Also, while it is preferable to provide perforations of the same size to simplify manufacturing, perforations of different diameters may be used as long as sufficient membrane material is provided to prevent turbulent entrainment across the membrane.

Referring again to FIG. 1, the edges of the membranes are detachably secured to the sides of the pond by way of a liner 40.

Membrane 28 has a ridge portion 42 extending around its outer peripheral edge which is received by a corresponding channel member 44 extending around the inner peripheral surface of the liner 40. Likewise, membrane 30 is detachably connected to the liner by a ridge portion 46 which is received in a channel portion 48 of the line 40.

The membranes can be adjustably supported by floats or the like at various points in the middle of the pond and likewise by adjustable supports at the edges or sides of the pond rather than fixedly secured to the liner 40. Adjustable support of the membrane permits vertical adjustement of the membrane to change existing zone boundaries at the pond temperature stabilizes, or to improve the efficiency of the pond. This also facilitates removal of the membranes for cleaning should this be necessary.

The pond is filled slowly a layer at a time in a manner well known in the art. The lower membrane 30 is preferably installed before filling the gradient layer to avoid disturbing the gradient layer after is has been established. Since the upper convecting layer is relatively shallow, the upper membrane 28 may be installed before or after the upper layer solution is poured. The depth of the gradient zone is on the order of one meter. The composition of the salt gradient layer solution is selected as a function of application depending upon the size of the pond and temperature gradient desired.

The heat absorbed in the lower convective layer may be extracted by way of a heat exchanger apparatus, represented by block 50 in FIG. 1, using techniques known in the art. For example, the liquid solution in the lower layer 22 can be circulated through the zone and to a heat exchanger located exteriorly of the pond. In this arrangement, the liquid solution is extracted from the pond at a location just below the membrane 30 and conducted to the external heat exchanger (not shown) via conduit 52. The solution is returned to the pond via conduit 54 and discharged at a location near the bottom of the pond. This arrangement, which involves extraction of solution from the pond, enhances convection in the lower convective zone.

Alternatively, the heat may be extracted by way of a heat exchanger located within the pond itself. In this arrangement, a second fluid, is circulated through a suitable conduit, allowing the fluid to absorb heat from the solution of the convective layer of conduction. Here the heat exchanger 50 would be a closed conduit within a portion extending with the lower layer and having an inlet 54 through which cold solution is introduced, and an outlet 52 through which the solution is extracted after it is heated.

The salt gradient solar pond can be used for space heating, domestic hot water heating, or lower temperature industrial heating application for example.

There has thus been described a salt gradient solar pond in which permeable barriers in the form of perforated membranes are provided at the barrier between the upper convective zone and the gradient zone and at the barrier between the gradient zone and the lower convective zone. The unperforated portion of each membrane provides a sufficient barrier to inhibit the passage of turbulence across the membrane while the perforations are large enough to allow easy molecular diffusion of salt across the membranes to thereby prevent the formation of convective zones in the gradient layer in the proximity of the membranes. In this manner, suppression of zone boundary migration is automatically achieved.

The membrane with separates the gradient zone from the upper convective zone prevents surface wind disturbances from penetrating into the gradient zone. The membrane that separates the gradient zone from the lower convective zone prevents disturbances due to withdrawal of fluid from the lower convective zone from disrupting the gradient zone.

Having thus disclosed in detail a preferred embodiment of the inventive apparatus and method, persons skilled in the art will be able to modify certain of the steps in which have been disclosed and to substitute equivalent elements for those described while continuing to practice the principle of the invention; and it is, therefore, intended that all such substitutions and modifications be covered as then are embraced within the spirit and scope of the appended claims.

The embodiments of the invention in which an exclusive property of privilege is claimed are defined as follows:

1. In a salt gradient solar pond having at least one convective layer and a non-convective salt gradient layer overlying said convective layer, the transition region between said non-convective gradient layer and said convective layer defining a zone boundary, said convective layer having a generally uniform salt concentration and temperature profile, heat derived from solar radiant energy being collected and stored in said convective layer, and said gradient layer having a salt concentration and temperature profile which increases from the upper portion of said gradient layer towards said zone boundary to enhance storage of heat in said convective layer, apparatus for suppressing migration of said zone boundary comprising:
   a membrane extending horizontally across the pond at a depth corresponding to the depth of said zone boundary to inhibit the passage of turbulence from said convective layer into said gradient layer,
   said membrane being of a material which is permeable to solar radiant energy and being perforated to permit vertical molecular diffusion of salt across the membrane thereby preventing the formation of a convective zone in the gradient layer in the proximity of said zone boundary, and
   support means for securing the edges of said membrane at the sides of said pond.

2. A salt gradient solar pond according to claim 1 wherein the ratio of perforated to unperforated surface portions of said membrane is in the range of ten percent to fifty percent.

3. A salt gradient solar pond according to claim 1 wherein the diameter of the perforations in said membrane is in the range of 0.1 millimeters to 1 centimeter.

4. In a salt gradient solar pond having a plurality of vertically oriented layers of a saline solution including upper and lower convective layers and a gradient layer interposed between said upper and lower convective layers, the transition region between said upper convective layer and said gradient layer defining an upper zone boundary and the transition region between said gradient layer and said lower convective layer defining a lower zone boundary, said upper and lower convective layers each having a generally uniform salt concentration and temperature profile, heat derived from solar radiant energy being collected and stored in said lower convective layer, and said gradient layer having a salt concentration and temperature profile which increases from said upper zone boundary to said lower zone boundary to enhance storage of heat in said lower convective layer, apparatus for suppressing migration of said upper and lower zone boundaries comprising:
   a first membrane extending horizontally across the pond at a depth corresponding to the depth of said upper zone boundary to inhibit the passage of turbulence from said upper convective layer into said gradient layer,
   a second membrane extending horizontally across the pond at a depth corresponding to the depth of the lower zone boundary, to inhibit the passage of turbulence from said lower convective layer into said gradient layer, said first and second membranes being of a material which is permeable to solar radiant energy and being perforated to permit vertical molecular diffusion of salt across the membranes thereby preventing the formation of convective zones in the gradient layer in the proximity of said first and second zone boundaries, and support means for securing the edges of said first and second membranes at the sides of said pond.

5. A salt gradient solar pond according to claim 4 wherein the ratio of perforated to unperforated surface portions of each said membranes is in the range of ten percent to fifty percent.

6. A salt gradient solar pond according to claim 4 wherein the ratio of perforated to unperforated surface portions of each of said membranes is approximately twenty percent.

7. A salt gradient solar pond according to claim 4 wherein the diameter of the perforations in said membranes is, in the range of 0.1 millimeters to 1 centimeter.

8. A salt gradient solar pond according to claim 1 4 which further comprises means for extracting solar heated solution from the lower convective layer, said second membrane preventing disturbances due to fluid motion during the extraction of solution from said lower convecting layer from eroding the gradient layer.

9. In a salt gradient solar pond having a plurality of vertically oriented layers of salt water solution including upper and lower convective layers and a gradient layer disposed between said upper and lower convective layers, the transition region between said upper convective layer and said gradient layer defining an upper zone boundary and the transition region between said gradient layer and said lower convective layer defining a lower zone boundary, said upper and lower convective layers each having a generally uniform salt concentration and temperature profile, and said gradient layer having a salt concentration and temperature profile which increases from said upper zone boundary to said lower zone boundary, a method for suppressing migration of said upper and lower zone boundaries comprising:

extending a first perforated membranes horizontally across the pond at a depth corresponding to the depth of said upper zone boundary to inhibit the passage of turbulence from said upper convective layer into said gradient layer while permitting vertical molecular diffusion of salt across the membrane, extending a second perforated membrane horizontally across the pond at a depth corresponding to the depth of the lower zone boundary to inhibit the passage of turbulence from said lower convective layer into said gradient layer while permitting vertical molecular diffusion of salt across the membrane; and, adjustably supporting the edges of said first and second membranes at the sides of said pond.

* * * * *